(12) United States Patent
Kim et al.

(10) Patent No.: US 8,198,358 B2
(45) Date of Patent: Jun. 12, 2012

(54) **POLYMERIZATION OF PHENOLIC COMPOUND USING *COPRINUS CINEREUS* PEROXIDASE**

(75) Inventors: Yong Hwan Kim, Daejeon (KR); Eun Suk An, Daejeon (KR); Jeong Mi Kwon, Chungcheongbuk-do (KR); Hyun Seong Jeong, Gwangju (KR); Seung Yeong Park, Daejeon (KR); Kee Hoon Won, Daejeon (KR); Jae Kwang Song, Daejeon (KR); Bong Keun Song, Daejeon (KR); Jeong Yong Ryu, Daejeon (KR)

(73) Assignee: Korea Institute of Chemical Technology, Daejeon (KR)

( * ) Notice: Subject to any disclaimer, the term of this patent is extended or adjusted under 35 U.S.C. 154(b) by 672 days.

(21) Appl. No.: 11/792,801

(22) PCT Filed: Dec. 6, 2005

(86) PCT No.: PCT/KR2005/004156
§ 371 (c)(1),
(2), (4) Date: Oct. 14, 2009

(87) PCT Pub. No.: WO2006/062337
PCT Pub. Date: Jun. 15, 2006

(65) Prior Publication Data
US 2011/0160386 A1    Jun. 30, 2011

(30) Foreign Application Priority Data
Dec. 9, 2004    (KR) .................. 10-2004-0103608

(51) Int. Cl.
*C09D 129/02* (2006.01)
*C12P 7/22* (2006.01)
*C09J 129/02* (2006.01)

(52) U.S. Cl. ......... 524/553; 435/156; 526/313; 526/318

(58) Field of Classification Search .................. 524/553; 435/156; 526/313, 318
See application file for complete search history.

(56) References Cited

U.S. PATENT DOCUMENTS

| | | | |
|---|---|---|---|
| 5,846,788 A | 12/1998 | Pedersen et al. | |
| 5,965,510 A | 10/1999 | Schneider et al. | |
| 5,968,883 A | 10/1999 | Cherry et al. | |
| 6,045,865 A * | 4/2000 | Felby et al. | ................ 427/297 |
| 6,258,769 B1 | 7/2001 | Welinder et al. | |
| 6,344,516 B1 | 2/2002 | Ikeda et al. | |

FOREIGN PATENT DOCUMENTS

| EP | 0 919 628 A1 | 6/1999 |
|---|---|---|
| EP | 919628 A1 * | 6/1999 |
| KR | 10-2005-0011958 | 1/2005 |

OTHER PUBLICATIONS

J. A. Akkara, et al. "Enzymatic synthesis and modification of polymers in nonaqueous solvents" TIBTECH Feb. 1999 (vol. 17) pp. 67-72 (6 pages).
Korean Patent Abstract for Korean Publication No. 1020050011958, Publication date Jan. 31, 2005 (1 page).
International Search Report for PCT/KR 2005/004156 mailed Mar. 14, 2006 (3 pages).

* cited by examiner

*Primary Examiner* — Michael M Bernshteyn
(74) *Attorney, Agent, or Firm* — Osha Liang LLP

(57) ABSTRACT

The present invention relates to a process for preparing phenolic polymers utilizing *Coprinus cinereus* peroxidase. More particularly, the present invention relates to a process for preparing phenolic polymers by polymerizing phenolic monomers with *Coprinus cinereus* peroxidase instead of using typical peroxidase which essentially requires the use of toxic formalin or peroxidase of plant origin which is very costly and easily deactivated by hydrogen peroxide in the polymerization of phenolic monomers, wherein the polymerization is conducted in the presence of a polar organic solvent under mild reaction conditions of atmospheric temperature and pressure to economically produce desired phenolic polymers having excellent water and chemical resistances with high yield.

7 Claims, 2 Drawing Sheets

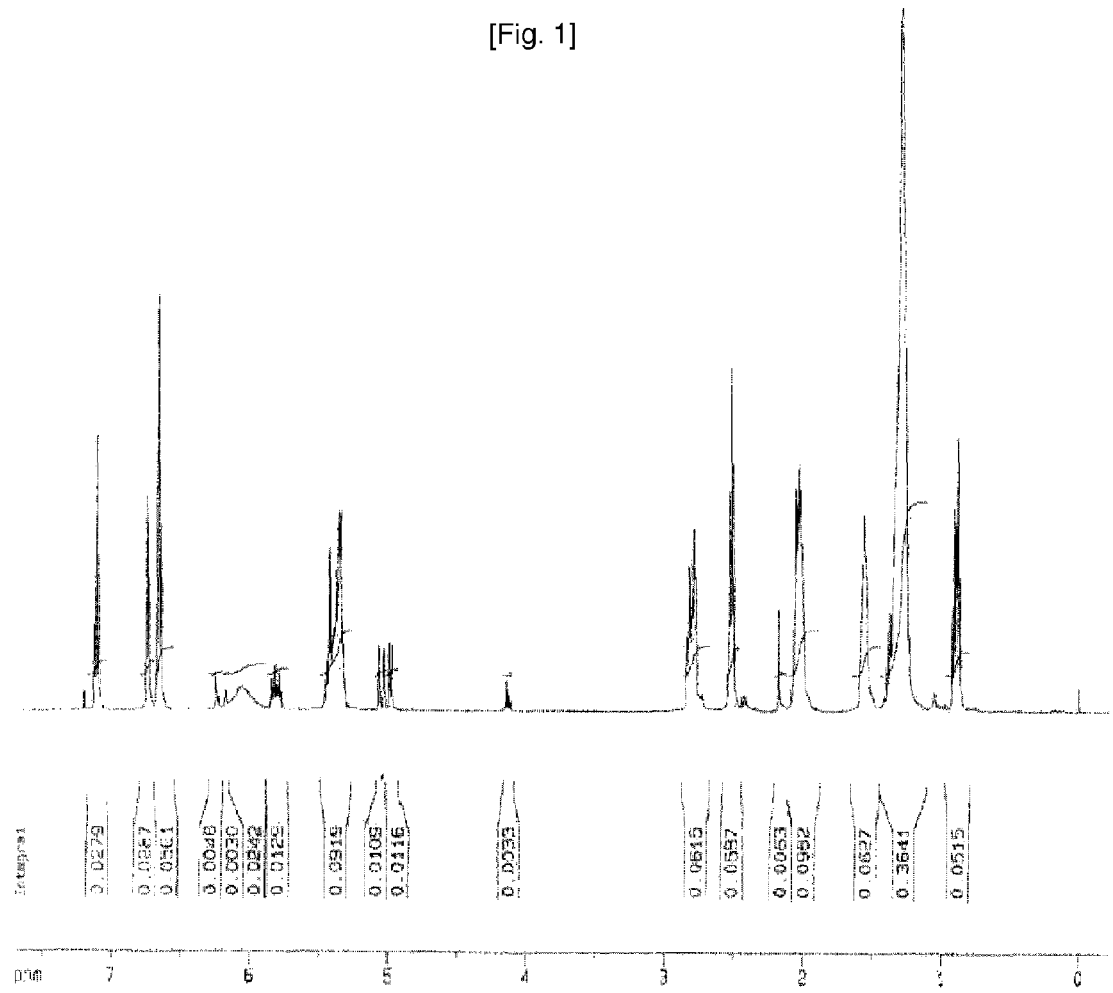
[Fig. 1]

[Fig. 2]
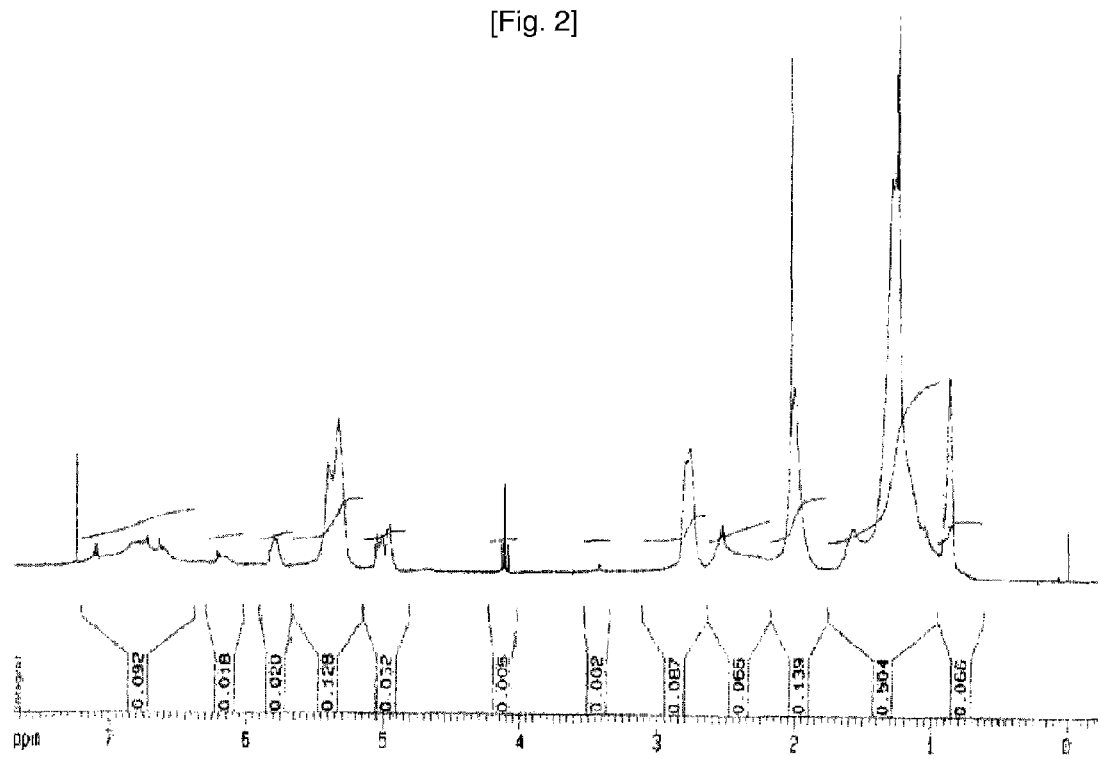
[Fig. 3]
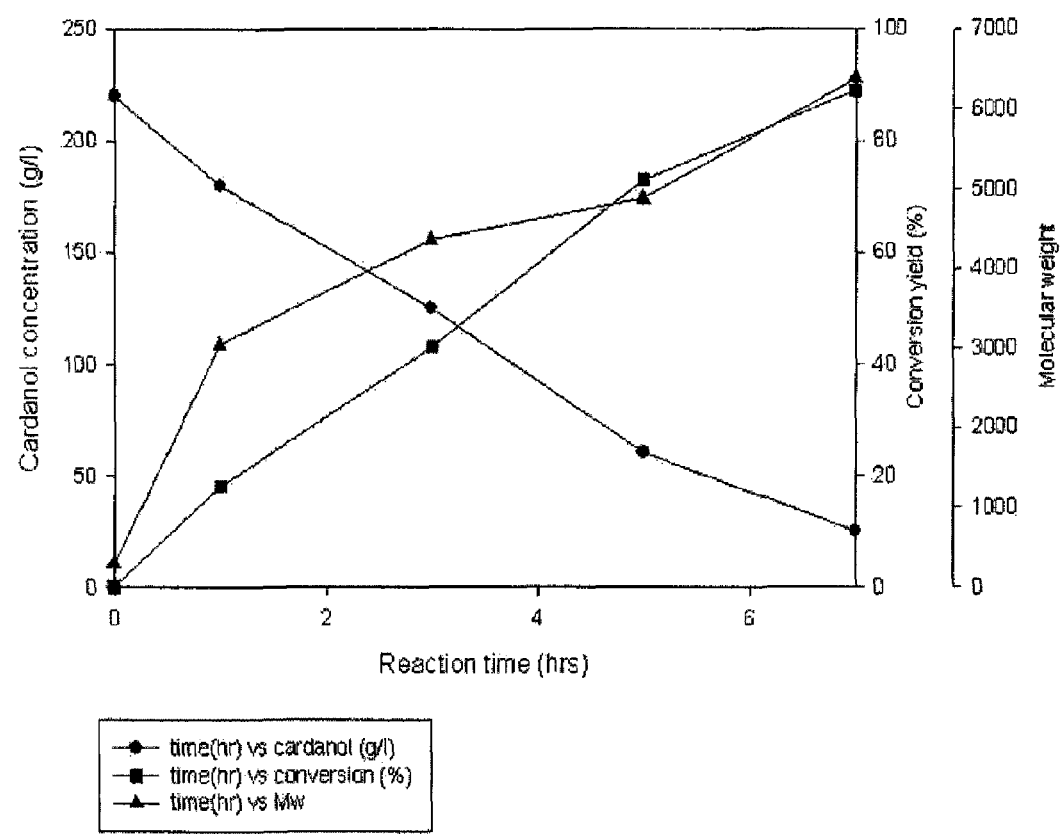

POLYMERIZATION OF PHENOLIC COMPOUND USING *COPRINUS CINEREUS* PEROXIDASE

TECHNICAL FIELD

The present invention relates to a process for preparing phenolic polymers utilizing *Coprinus cinereus* peroxidase and more particularly, a process for preparing phenolic polymers by polymerizing phenolic monomers with *Coprinus cinereus* peroxidase instead of using a typical synthesis method which essentially requires the use of toxic formalin or peroxidase of plant origin which is very costly and easily deactivated by hydrogen peroxide in the polymerization of phenolic monomers, wherein the polymerization is conducted in the presence of a polar organic solvent under mild reaction conditions of atmospheric temperature and pressure for economical production of desired phenolic polymers having excellent water and chemical resistances with high yield.

Phenol polymers can be divided into novolac- and resol-type obtainable from phenol and formaldehyde condensation in the presence of acid or base. Since formaldehyde, which is an essential material in the preparation of phenol polymers, is highly toxic, the need to develop new polymerization methods using non-toxic formaldehyde free materials is increasing. Use of oxidoreductases such as horseradish peroxidase, soybean peroxidase, laccase, and the like have been disclosed (TIBTech. 17:67, 1999)]. However, since such oxidoreductases are plant-originated so that they are very costly and can be easily deactivated by hydrogen peroxide, it is not practical to use in the preparation of phenol polymers. Further, use of transition metal complex such as Fe-SALEN in the preparation of phenolic polymers is disclosed (U.S. Pat. No. 6,344,516, Macromol. Rapid Commun. 21(8):496-499, 2000). However, there are some drawbacks that the transition metal complex such as Fe-SALEN, substituted for peroxidase, has to be synthesized, is costly, requires a large amount in preparing phenolic polymers, accompanies crosslinking reaction with the produced phenolic polymers during the reaction, and accompanies an exothermic reaction when preparing bulk phenolic polymers.

Meanwhile, the inventors of the present invention have disclosed the use of phenolic polymers prepared using a biocatalyst such as soybean peroxidase or *Aspergillus* peroxidase for antifouling paints in Korean Patent No. 2003-51034. However, soybean peroxidase is extracted directly from beans so that it has high influence of climate and also is highly costly because purification and isolation is very difficult. Also, *Aspergillus* peroxidase is highly unstable in the presence of hydrogen peroxide and organic solvents so that it is difficult to use in the preparation of phenolic polymers.

BACKGROUND ART

The inventors of the present invention have made every effort to develop a process to solve the foregoing problems of high cost, difficulty in purification and isolation, and unstability in the presence of solvents and hydrogen peroxide, and have finally completed developing a process for preparing phenolic polymers utilizing *Coprinus cinereus* peroxidase instead of using plant-derived peroxidase which is very costly as a biocatalyst and easily deactivated by hydrogen peroxide in the polymerization conducted in the presence of a polar organic solvent under mild reaction conditions of atmospheric temperature and pressure to economically produce desired phenolic polymers having excellent water and chemical resistances with high yield.

Accordingly, an object of the invention is to provide a process for preparing phenolic polymers economically having water resistance and chemical resistance in high yield by utilizing the peroxidase produced by *Coprinus cinereus*.

DISCLOSURE

In an aspect, the present invention relates to a process for the preparation of phenolic polymers by polymerizing phenolic monomer and peroxidase by using an oxidizing agent, comprising:

using *Coprinus cinereus* peroxidase indicated as SEQ ID No: 1; and performing a reaction at a temperature of 22 to 27° C. in the presence of a polar organic solvent.

In another aspect, the present invention relates to the use of the phenolic polymer which is cured by utilizing a curing catalyst of transition metal and organic ligand complex.

The present invention is described in more detain as follows.

The present invention relates to a process for preparing phenolic polymers by polymerizing phenolic monomers with *Coprinus cinereus* peroxidase instead of using the typical peroxidase which essentially requires the use of toxic formalin or plant-derived peroxidase which is very costly and easily deactivated by hydrogen peroxide in the polymerization of phenolic monomers, wherein the polymerization is conducted in the presence of a polar organic solvent under mild reaction conditions of atmospheric temperature and pressure to economically produce desired phenolic polymers having excellent water and chemical resistances with high yield.

Examples of the phenolic monomer used in the present invention include plant phenol-based oils such as cardanol and cardol, anacardic acid, ginkoic acid, methylcardol, urushiol, thitsiol, laccol, and phenols and alkylphenol(methylphenol, ethylphenol, propylphenol, butylphenol, t-butylphenol, octylphenol, nonylphenol), alkenylphenol, and the like, produced in the petrochemical industry.

According to the present invention, it is noted that especially peroxidase from *Coprinus cinereus* shows higher activity and more efficient in the polymerization of phenols than various peroxidases. It is also noted that culture conditions are established for mass production of the peroxidase efficiently from *Coprinus cinereus*. Although *Coprinus cinereus* shows high growth rate with potato starch as a carbon source, peroxidase is not produced by the solution. Thus, glucose is used as a carbon source for production of peroxidase. The concentration may be in the range of from 1 g/L to 300 g/L with use of glucose as a carbon source. In order to produce high concentration of active peroxidase within 5 days it is preferable to cultivate at a concentration of 20 g/L. It is also preferable to supply heme from the outside, an active site compound of peroxidase, to enhance the activity of the peroxidase. A concentration of 1 μM to 1 mM heme is supplied in the invention. It is more preferable to supply 100-200 μM of heme to obtain high activity of the peroxidase. Not only animal erythrocytes including heme instead of heme can be supplied to enhance the activity but also 5-aminolevulic acid which is a precursor of heme synthesis can.

Amount of the peroxidase solution (1 mg/mL) is 0.1-1.0 parts by weight to 1 part by weight of phenolic monomer. If the amount is less than 0.1 parts by weight, the reaction rate is too low to perform the reaction and if it is higher than 1.0 parts by weight, it becomes too costly and causes crosslinking with the polymerized product so that it cannot provide stable phenolic polymers.

It also requires using of an oxidizing agent in the polymerization of phenolic monomers with use of peroxidase. Example of oxidizing agent includes organic hydrogen peroxides such as hydrogen peroxide, t-butylhydroperoxide, and t-ethylhydroperoxide and it is used in the range of from 0.1 to 1.5 mole ratio to the phenolic monomer. Here, when the amount is less than 0.1 mole ratio, it causes low yield and if it is higher than 1.5 mole ratio, activity of peroxidase is rapidly lowered.

It is essential to use an appropriate organic solvent to dissolve phenol compounds in the preparation of phenolic polymer by the polymerization of phenolic monomer using *Coprinus cinereus* peroxidase. It is preferred to use an aqueous solution of alcohols such as isopropanol, methanol, ethanol, and t-butanol. The alcohol is used by mixing 30-70 vol. % of a buffer solution and the amount used is in the range of from 30 to 70 vol. % to total volume of reactants. If it is less than 30 vol. %, it causes phase separation due to lowered solubility of phenolic monomer and thus it is not able to apply high concentration of the monomer. On the other hand, if it is higher than 70 vol. %, the activity of peroxidase used as a biocatalyst is rapidly lowered and thus, the reaction cannot be processed.

As described above, the present invention provides an improved process to produce phenolic polymers with higher molecular weight compared to the conventional processes, wherein the polymerization is conducted in a mild condition of atmospheric temperature (15-27° C.) and atmospheric pressure instead of high temperature and pressure and without using toxic compounds such as formalin.

In addition, use of *Coprinus cinereus* peroxidase, which is economical in cost and stable against hydrogen peroxide, instead of plant peroxidase that is costly and unstable against hydrogen peroxide, results in high yield of production of phenolic polymers in the present invention.

The phenolic polymer prepared by the above-described method itself shows excellent antioxidative activity so that it can be suitable for various fields requiring antioxidative activity, particularly food storage containers, interior coating materials, and marine paint compositions requiring antifouling performance. Further, it can be applied in all the industrial fields using general phenolic polymers.

In order to apply the polymerized phenolic polymer for coating material does it require a curing process utilizing radical crosslinking reaction of alkenyl branch group of the phenolic polymer. A catalyst used in the curing process is transition metal and organoligand complex and example includes cobalt naphthenate, manganese naphthenate, and the like. Such catalyst is used in the range of from 0.05-0.3 parts by weight to 1 part by weight of the phenolic polymer. If the amount is less than 0.05 parts by weight, it requires a longer time for curing and thus results in reduced strength of the coated layer of the phenolic polymer and if it is higher than 0.3 parts by weight, curing proceeds too rapidly to coat and thus causes formation of folds during the coating process. Methylethylketone peroxide can be also added to improve curing hardness.

DESCRIPTION OF DRAWINGS

FIG. 1 is a $^1$H-NMR spectrum of cardanol.
FIG. 2 is a $^1$H-NMR spectrum of polycardanol.
FIG. 3 is a graph illustrating changes of molecular weight and disappearance of cardanol at the presence of *Coprinus cinereus* peroxidase according to reaction time.

BEST MODE

The present invention will be described in further detail by way of the following examples, but they should not be construed as limiting the scope of the present invention.

EXAMPLE 1

Wild species of *Coprinus cinereus* was used and cultivated in a culture medium as the follows. After dissolving 3 g yeast extracts, 10 g peptone, 0.2 g ferrous sulfate(FeSO$_4$☐7H$_2$O), 1 g magnesium sulfate(MgSO$_4$☐7H$_2$O), and 20 g glucose in 1 L water, the mixture solution was controlled to have pH 7.0. The mixture solution was shaken in 30° C., at 180 rpm and sample was obtained everyday and each sample was used to determine activity of peroxidase produced by the medium. The peroxidase activity was determined by measuring amount of color development of ABTS (2,2'-azino-bis(3-ethylbenzthiazonline-6-sulphonic acid) oxidized at 405 nm via spectrometry. The peroxidase activities were expressed as units per milliliter, where 1 U was defined as 1 mmol of ABTS oxidized per min. The peroxidase activities according to times were summarized in Table 1.

TABLE 1

*Coprinus cinereus* Peroxidase Activity with Times

| Cultivation time (day) | *Coprinus cinereus* peroxidase activity (U/mL) |
| --- | --- |
| 1 | 0 |
| 2 | 0 |
| 3 | 30 |
| 4 | 60 |
| 5 | 90 |
| 6 | 150 |
| 7 | 350 |

As shown in Table 1, it is noted that *Coprinus cinereus* peroxidase is not produced initially but after 3 days it starts to produce and it shows the highest activity at 7th day

EXAMPLE 2

*Coprinus cinereus* peroxidase prepared in Example 1 was separated from the culture medium and concentrated by the following process. The culture medium was filtered through a filter having a stomatal size of 1 μm to remove cells. Filtrate including peroxidase was concentrated using continuous ultra-filtration membrane(molecular weight in excess of 10,000, Amicon, USA) to be concentration ratio of 10 times. Ammonium sulfate((NH$_4$)$_2$SO$_4$) was added to be 70% in weight ratio to the total volume to precipitate out peroxidase. The peroxidase was isolated and purified by using SDS polyacrylamide gel electrophoresis (SDS-PAGE). Portions showing peroxidase activity among bands were determined by the appearance of brown coloration after the incubation with 0.1 M guaiacol solution. Protein amino acid sequence of the peroxidase isolated was determined by using ESI-QTOF and the protein sequence was indicated as SEQ ID No: 1 and total number of amino acids is 344.

EXAMPLE 3

Heme dissolved in DMSO was added in the culture solution of Example 1 and *Coprinus cinereus* spore was added thereto and the mixture was cultivated in a shaking incubator. The *Coprinus cinereus* peroxidase activity produced by the culture medium according to the concentration of heme added was summarized in Table 2.

TABLE 2

Changes of peroxidase activity according to the concentration of heme added (measurement after 7 days)

| concentration of heme (µM) | peroxidase activity (U/ml) |
| --- | --- |
| 0 | 350 |
| 20 | 500 |
| 50 | 720 |
| 100 | 1100 |
| 200 | 1300 |
| 500 | 500 |

As shown in Table 2, it is noted that peroxidase activity is the highest at the heme concentration of 200 µM and decreases at the higher concentration of 200 µM which is resulted from toxicity of DMSO used. Ammonium sulfate $((NH_4)_2SO_4)$ was added to be 70% in weight ratio to the total volume to precipitate out peroxidase and 0.1M sodium phosphate buffer was added to produce an enzyme solution containing peroxidase having peroxidase activity of about 10,000 U/ml.

EXAMPLE 4

Cardanol (Palmer International, USA) isolated from cashew nut extracts has a purity of 90-95 wt. % and contains 3-6 wt. % of cardol. 0.6 g of cardanol (2 mmol) was dissolved in a mixture solution of 12.5 ml of isopropanol and 12.5 ml of phosphate buffer (0.1 M, pH 7.0) and further 0.6 g of concentrated *Coprinus cinereus* peroxidase prepared in Example 3 (10,000 U/mL) was added. 300 m L of 30% hydrogen peroxide solution (2.6 mmole) was added continuously, evenly for 6 hours. The reaction temperature was room temperature and mixed enough to be homogeneous solution. After the reaction was complete, the reaction solution was concentrated under pressure and 20 mL of ethyl acetate was added thereto. The ethyl acetate solution was collected and evaporated under pressure to obtain phenolic polymer, polycardanol. The peroxidase activity was determined by measuring development of coloration via spectrometric assay with ABTS (2,2'-azino-bis(3-ethylbenzthiazonline-6-sulphonic acid). Molecular weight of the product was determined by using GPC (Gel permeation chromatography) equipped with a detector of refraction index. Weight average molecular weight was 8,000-13,000 and average yield was higher than 70%. FIG. 1 is a $^1$H-NMR spectrum of cardanol before the reaction and FIG. 2 is a $^1$H-NMR spectrum of polycardanol after the reaction. Referring FIGS. 1 and 2, the hydrogen peaks at 6-7.2 ppm were broaden and hydrogen peaks positioned at benzene ring were disappeared after the reaction which meant direct bonding between benzene ring and benzene ring by peroxidase.

COMPARATIVE EXAMPLES 1-3

Organic solvents and peroxidases shown in Table 3 were conducted in the same manner in Example 4

TABLE 3

| Category | Cardanol (mmol) | Organic solvent | Bio-catalyst | Yield (%) | Mw | Mn |
| --- | --- | --- | --- | --- | --- | --- |
| Example 1 | 2.0 | methanol | CiP | 72.0 | 12,808 | 3,540 |
| Example 2 | 2.0 | ethanol | CiP | 85.0 | 10,974 | 4,096 |
| Example 3 | 2.0 | isopropanol | CiP | 95.0 | 8,221 | 3,411 |

TABLE 3-continued

| Category | Cardanol (mmol) | Organic solvent | Bio-catalyst | Yield (%) | Mw | Mn |
| --- | --- | --- | --- | --- | --- | --- |
| Comparative Example 1 | 2.0 | methanol | SBP | 42.5 | 12,808 | 3,540 |
| Comparative Example 2 | 2.0 | ethanol | SBP | 50.4 | 10,974 | 4,096 |
| Comparative Example 3 | 2.0 | isopropanol | HRP | 0 | — | — |

CiP: *Coprinus cinereus* peroxidase
SBP: soybean peroxidase
HRP: horseradish peroxidase As shown in Table 3, when horseradish peroxidase was used in the presence of isopropanol, no polycardanol was produced and when soybean peroxidase was used, the yield was much lower.

EXAMPLE 5

6 g of cardanol (20 mmol) was dissolved in a mixture solution of 17.5 mL of isopropanol and 7.5 mL of phosphate buffer (0.1 M, pH 7.0) and then 6 g of concentrated *Coprinus cinereus* peroxidase (10,000 U/mL) in Example 3 was added thereto. 3000 m L of 15% hydrogen peroxide solution (13.2 mmole) was added continuously, evenly for 7 hours. The reaction temperature was room temperature and mixed enough to be homogeneous solution. After the reaction was complete, the reaction solution was concentrated under pressure and 20 mL of ethyl acetate was added thereto. The ethyl acetate solution was collected and evaporated under pressure to obtain phenolic polymer, polycardanol. The peroxidase activity was determined by measuring development of coloration via spectrometric assay with ABTS (2,2'-azino-bis(3-ethylbenzthiazonline-6-sulphonic acid). Molecular weight of the product was determined by using GPC (Gel permeation chromatography) equipped with a detector of refraction index. Weight average molecular weight was 5,000-10,000 and average yield was higher than 90%. FIG. 3 is FIG. 3 is a graph illustrating changes of molecular weight and disappearance of cardanol in the presence of *Coprinus cinereus* peroxidase according to reaction time. Referring FIG. 3, it is noted that cardanol was polymerized with addition of hydrogen peroxide and thus molecular weight was rapidly increased in the beginning and gently increased later. It is also noted that even a concentration of 22% (w/v) cardanol was polymerized with higher than 90% yield when *Coprinus cinereus* peroxidase was used. In the preparation of general polymers it is more economical in cost with higher concentration of monomers and 22% (w/v) of the monomer in the present invention is practically economical. Therefore, use of *Coprinus cinereus* peroxidase can be suitable in the mass production of polymers.

EXAMPLE 6

Polycardanols prepared in Examples 4 and 5 are linear polymers soluble in a solvent. 0.05 parts by weight of cobalt naphthenate, or 0.05 parts by weight of cobalt naphthenate and 0.05 parts by weight of methylethylketone peroxide, relatively to 1 part by weight of polycardanol were added to provide crosslinking of polycardanols. It formed firm film on the surface, when coated, by crosslinking unsaturated fatty acids existing on the polycardanol.

The following Table 4 shows hardness of film produced by adding cobalt naphthenate and methylethylketone peroxide. Hardness was determined by the standard pencil test method. When cobalt naphthenate as a curing catalyst was not used, hardness was not increased at all with time passage. When the amount of cobalt naphthenate was increased, hardness also increased within a short period of time. When methylethylketone peroxide was additionally used, the curing process proceeded very fast and hardness was also equal to or higher than those of antifouling paints.

TABLE 4

Hardness according to time with use of a curing agent

| Category Composition of curing agent(parts by weight) | time | | | | |
|---|---|---|---|---|---|
| | 1 hour | 1 day | 3 day | 5 day | 9 day |
| No addition | — | — | — | — | — |
| cobalt naphthenate(0.05) | — | 5B | 2H | 3H | 3H |
| cobalt naphthenate(0.1) | — | 2H | 3H | 4H | 5H |
| cobalt naphthenate(0.05)/ methylethylketone peroxide (0.05) | contactable | 3H | 4H | 6H | 7H |
| Marine antifouling paint (International Paint, Netherlands) | contactable | 2H | 2H | 3H | 4H |

Industrial Applicability

As describe above, the method for preparing phenolic polymers by employing *Coprinus cinereus* peroxidase of the present invention is much more environmental friendly and efficient compared to the conventional methods conducted at high temperature and pressure and use of toxic materials (i.e., formalins) since it is conducted in a very mild condition of atmospheric temperature and pressure and does not require use of toxic materials. Further, it is more cost-effective and provides a relatively higher yield of production than when plant peroxidase is used.

The phenolic oils prepared by employing peroxidase can be replaced japanning coating materials since they exhibit very similar property of lacquer which has been used traditionally. They can be also suitable for food storage containers due to their antioxidative activities and interior coating materials of equipments and the most preferably, antifouling coating materials to prevent any contamination of marine fouling organisms. They can be easily applied in any industrial fields using phenol polymers such as break lining materials, bread pad materials, ink materials, adhesive materials, epoxyresin materials and the like.

The invention claimed is:

1. A process for polymerizing phenolic compound in the preparation of phenolic polymers by polymerizing phenolic monomer and peroxidase by using an oxidizing agent, comprising:

*Coprinus cinereus* peroxidase wherein the temperature of the reaction is from 15 to 27° C. in the presence of a polar organic solvent, and wherein in said polymerization of peroxidase and phenolic monomer, 100-200 μM of heme is added.

2. The process of claim 1, wherein said phenolic monomer is selected from the group consisting of cardanol, cardol, anacardic acid, ginkoic acid, methylcardol, urushiol, thitsiol, laccol, phenol, alkylphenol, and alkenylphenol.

3. The process of claim 1, wherein said *Coprinus cinereus* peroxidase is used in the range of from 0.1 to 1.0 parts by weight based on 1 part by weight of the phenolic monomer.

4. The process of claim 1, wherein said oxidizing agent is hydrogen peroxide or organic peroxide to be used in the amount of from 0.1 to 1.5 moles based on 1 mole of the phenolic monomer.

5. The process of claim 1, wherein said polar organic solvent is selected from the group consisting of isopropanol, methanol, ethanol, and t-butanol.

6. A coating material cured with the phenolic polymer prepared according to the porcess in claim 1.

7. An adhesive cured with the phenolic polymer prepared according to the process in claim 1.

* * * * *